United States Patent
Miyazaki

(10) Patent No.: US 10,696,825 B2
(45) Date of Patent: Jun. 30, 2020

(54) RUBBER COMPOSITION AND PNEUMATIC TIRE

(71) Applicant: SUMITOMO RUBBER INDUSTRIES, LTD., Hyogo (JP)

(72) Inventor: Tatsuya Miyazaki, Kobe (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 43 days.

(21) Appl. No.: 16/028,125

(22) Filed: Jul. 5, 2018

(65) Prior Publication Data

US 2019/0023879 A1   Jan. 24, 2019

(30) Foreign Application Priority Data

Jul. 19, 2017 (JP) ................................ 2017-139987
May 23, 2018 (JP) ................................ 2018-098906

(51) Int. Cl.
*C08L 9/06* (2006.01)
*C08L 9/00* (2006.01)
*C08L 7/00* (2006.01)
*B60C 1/00* (2006.01)

(52) U.S. Cl.
CPC ..................... *C08L 9/06* (2013.01); *B60C 1/00* (2013.01); *B60C 1/0016* (2013.01); *C08L 7/00* (2013.01); *C08L 9/00* (2013.01); *C08L 2205/025* (2013.01); *C08L 2205/03* (2013.01)

(58) Field of Classification Search
CPC .......... C08L 9/06; C08L 9/00; C08L 2205/03; C08L 2205/025; C08L 7/00; B60C 1/0016

See application file for complete search history.

(56) References Cited

U.S. PATENT DOCUMENTS 5,756,589 A * 5/1998 Sandstrom ............ B60C 1/0016
152/564

* cited by examiner

*Primary Examiner* — Robert D Harlan
(74) *Attorney, Agent, or Firm* — Studebaker & Brackett PC

(57) ABSTRACT

Provided is a rubber composition having improved initial dry grip performance, durability of dry grip performance, and chipping resistance (elongation at break). The rubber composition includes: a diene polymer; carbon black and/or silica; and a sulfur-containing oligomer having a weight average molecular weight of 4,000 or more, determined by GPC in chloroform solvent using polystyrene standard oligomers.

8 Claims, No Drawings

RUBBER COMPOSITION AND PNEUMATIC TIRE

TECHNICAL FIELD

The present invention relates to a rubber composition and a pneumatic tire including the rubber composition.

BACKGROUND ART

Vulcanization of diene polymers generally involves using powdered sulfur, insoluble sulfur, or the like, or hybrid crosslinking agents which allow for reduction in sulfur content, as well as vulcanization accelerators, zinc oxide, fatty acids, and other agents. Using sulfur-containing powder or liquid compounds in place of powdered sulfur is also proposed.

In other known techniques, the amount of sulfur is reduced, and resorcin or phenol resins and formalin are used to reinforce crosslinking. However, these resins are too polar to penetrate into the polymer matrix, and it is difficult to obtain satisfactory elongation at break, abrasion resistance, and other properties.

Thus, since the affinity for diene polymers such as styrene butadiene rubber, polybutadiene rubber, and natural rubbers is still low in the conventional techniques, it is difficult to uniformly distribute elemental sulfur in rubber. For this reason, a sufficient amount of sulfur crosslinks cannot be formed more uniformly in the polymer matrix, and therefore good tensile properties cannot be obtained. In addition, the tire properties such as durability of grip during running and running performance are not satisfactory, and further improvement is needed.

SUMMARY OF INVENTION

Technical Problem

The present invention aims to solve the problem and provide a rubber composition having improved initial dry grip performance, durability of dry grip performance, and chipping resistance (elongation at break).

Solution to Problem

The present invention relates to a rubber composition, including: a diene polymer; at least one of carbon black or silica; and a sulfur-containing oligomer having a weight average molecular weight of 4,000 or more, determined by GPC in chloroform solvent using polystyrene standard oligomers.

The sulfur-containing oligomer preferably contains 10 to 95% by mass of elemental sulfur.

The sulfur-containing oligomer preferably contains a repeating unit represented by the following formula (I):

$$—R—S_x— \qquad (I)$$

wherein R represents a substituted or unsubstituted divalent hydrocarbon group optionally containing a heteroatom; and x on average is 1.0 to 10.0.

The sulfur-containing oligomer preferably has a polarity parameter SP of 12.5 or less.

The sulfur-containing oligomer is preferably produced by reacting a dihalogen compound represented by the following formula (I-1):

$$H—R—H \qquad (I-1)$$

wherein each H is the same or different and represents a halogen atom; and R represents a substituted or unsubstituted divalent hydrocarbon group optionally containing a heteroatom, with an alkali metal polysulfide represented by the following formula (I-2):

$$M_2S_x \qquad (I-2)$$

wherein M represents an alkali metal; and x on average is 1.0 to 10.0.

The dihalogen compound is preferably 2,2'-dichloroethyl ether.

The rubber composition preferably includes the sulfur-containing oligomer in an amount of 1.0 part by mass or more per 100 parts by mass of the diene polymer.

The rubber composition preferably includes one or two or more vulcanization accelerators.

Another aspect of the present invention relates to a pneumatic tire, formed from the rubber composition.

Advantageous Effects of Invention

The rubber composition of the present invention includes: a diene polymer; carbon black and/or silica; and a specific sulfur-containing oligomer. Such a rubber composition provides improved initial dry grip performance, durability of dry grip performance, and chipping resistance (elongation at break).

DESCRIPTION OF EMBODIMENTS

The rubber composition of the present invention includes: a diene polymer; carbon black and/or silica; and a sulfur-containing oligomer having a weight average molecular weight of 4,000 or more, determined by GPC in chloroform solvent using polystyrene standard oligomers. The rubber composition is excellent in initial dry grip performance, durability of dry grip performance, and chipping resistance (elongation at break). The present invention is novel in that the sulfur-containing oligomer (e.g. rubbery) having a predetermined molecular weight is used as a sulfur donor in sulfur crosslinking of diene rubber compounds. Owing to this feature, the present invention provides an improved balance of initial dry grip performance, durability of dry grip performance, and chipping resistance (elongation at break).

Although not clear, the reason (mechanism) for the above effect seems to be as follows.

The sulfur-containing oligomer used in the rubber composition is a polymer (oligomer) which is well compatible with diene polymers such as styrene-butadiene polymers, and which preferably has a polarity parameter SP of lower than that of powdered sulfur to be able to come closer to such diene polymers, thereby resulting in good dispersion of sulfur in rubber. Moreover, the chains of the sulfur-containing oligomer tend not to be easily cut, and the oligomer tends to penetrate between the diene polymer molecules (or between the diene rubber molecules). Then, the sulfur-containing oligomer releases elemental sulfur at a usual vulcanization temperature. The released sulfur and other agents such as vulcanization accelerators, zinc oxide, and fatty acids form crosslinking complexes (crosslinking intermediates) uniformly in the diene polymer matrix, thereby resulting in uniform crosslinking between the polymers. The crosslinking complexes provide crosslinking not only at the end portions of the diene polymers but at the central diene portions of the polymer chains as well.

Thus, when the rubber composition is used in tires, if some sulfur crosslinks at the polymer ends are cut during running, the remaining neighboring supporting crosslinking points will keep the entanglement of the diene polymer chains and their positions relative to the fillers or other agents. Therefore, even liquid styrene-butadiene copolymers, resins, carbon black, and the like tend not to separate easily from the diene polymers, thereby resulting in long lasting grip performance. In addition, excellent elongation at break and chipping resistance are also obtained. Thus, the rubber composition containing the specific sulfur-containing oligomer according to the present invention excels rubber compositions containing conventional crosslinking agents such as powdered sulfur or hybrid crosslinking agents in initial dry grip performance, durability of dry grip performance, and chipping resistance (elongation at break). In particular, dry grip performance during the late phase of running seems to be significantly improved.

[Crosslinking Agent]

The rubber composition contains a sulfur-containing oligomer having a weight average molecular weight (Mw) of 4,000 or more, determined by GPC in chloroform solvent using polystyrene standard oligomers. Since the sulfur-containing oligomer having a Mw of 4000 or more is rubbery, it has extremely high affinity and miscibility with diene polymers such as SBR and NR, and disperses very well in such diene polymers. Consequently, initial dry grip performance, durability of dry grip performance, and chipping resistance (elongation at break) tend to be improved. The lower limit of the Mw is preferably 8,000 or more, more preferably 10,000 or more. The upper limit of the Mw is not particularly critical, and the molecular weight is difficult to precisely determine due to cleavage of the molecules by solvents, but it is similar to the molecular weight of SBR or NR, preferably 2,000,000 or less, more preferably 1,600,000 or less, still more preferably 1,400,000 or less. The upper limit of the Mw may also be 100,000 or less, 80,000 or less, or 50,000 or less.

The Mw refers to a Mw determined by gel permeation chromatography (GPC) in chloroform as a solvent using polystyrene standard oligomers, specifically by a method described later in the EXAMPLE section.

In view of the aforementioned balance of properties, the sulfur-containing oligomer preferably contains 10 to 95% by mass of elemental sulfur. The lower limit of the amount of elemental sulfur is more preferably 30% by mass or more, still more preferably 40% by mass or more, particularly preferably 45% by mass or more. The upper limit is more preferably 90% by mass or less, still more preferably 75% by mass or less.

The sulfur-containing oligomer preferably contains a repeating unit represented by the following formula (I) to improve the aforementioned balance of properties.

(I)

In the formula, R represents a substituted or unsubstituted divalent hydrocarbon group optionally containing a heteroatom; and x on average is 1.0 to 10.0.

The substituted or unsubstituted divalent hydrocarbon group optionally containing a heteroatom as R may be a linear group, a cyclic group, or a branched group, preferably a linear group. Non-limiting examples of the heteroatom include oxygen and nitrogen. The carbon number of the divalent hydrocarbon group is preferably 1 or more, more preferably 2 or more, but is preferably 20 or less, more preferably 18 or less, still more preferably 12 or less, particularly preferably 8 or less.

Specific examples of the divalent hydrocarbon group include substituted or unsubstituted C1-C18 alkylene groups, C5-C18 cycloalkylene groups, and C1-C18 alkylene groups containing oxyalkylene groups. Among these, substituted or unsubstituted C1-C18 alkylene groups and substituted or unsubstituted C1-C18 alkylene groups containing oxyalkylene groups are preferred. Non-limiting examples of substituents that may be used for the divalent hydrocarbon group as R include functional groups such as hydroxy, phenyl, and benzyl groups.

Specific examples of the substituted or unsubstituted C1-C18 alkylene groups include substituted or unsubstituted methylene, ethylene, trimethylene, tetramethylene, pentamethylene, hexamethylene, octylene, nonylene, decylene, and 1,2-propylene groups.

Examples of the substituted or unsubstituted C1-C18 alkylene groups containing oxyalkylene groups include alkylene groups containing oxyalkylene groups in which a group represented by $(CH_2CH_2O)_p$, a group represented by $(CH_2)_q$, and a group represented by $(CH_2O)_r$ (where p represents an integer of 1 to 5, q represents an integer of 0 to 2, and r represents an integer of 0 to 2) are bound to one another in any order. Preferred examples include
—$CH_2CH_2OCH_2CH_2$—, —$(CH_2CH_2O)_2CH_2CH_2$—,
—$(CH_2CH_2O)_3CH_2CH_2$—, —$(CH_2CH_2O)_4CH_2CH_2$—,
—$(CH_2CH_2O)_5CH_2CH_2$—, —$(CH_2CH_2O)_2CH_2$, and
—$CH_2CH_2OCH_2OCH_2CH_2$—.

The average value x is 1.0 to 10.0, and is preferably 2.0 or more, more preferably 3.0 or more, still more preferably 3.5 or more, but preferably 6.0 or less, more preferably 5.0 or less, still more preferably 4.5 or less. The average number (n) of repeating units of formula (I) is preferably 10 or more, more preferably 20 or more, still more preferably 35 or more, but is preferably 1,000 or less, more preferably 400 or less, still more preferably 110 or less.

The sulfur-containing oligomer preferably has a polarity parameter SP of 12.5 or less. Such a sulfur-containing oligomer has higher dispersibility in the diene polymer, resulting in an improvement in the aforementioned balance of properties. The upper limit of the SP value is preferably 12.0 or less, more preferably 11.5 or less. The lower limit is not particularly critical, but is preferably 7.0 or more, more preferably 8.0 or more, still more preferably 9.0 or more, particularly preferably 10.0 or more, most preferably 10.5 or more.

The polarity parameter SP as used herein refers to a solubility parameter calculated by the Hoy method using the structure of the compound used. The Hoy method is described in, for example, K. L. Hoy, "Table of Solubility Parameters", Solvent and Coatings Materials Research and Development Department, Union Carbide Corp. (1985).

The sulfur-containing oligomer is preferably produced by reacting a dihalogen compound represented by the following formula (I-1):

(I-1)

wherein each H is the same or different and represents a halogen atom; and R represents a substituted or unsubstituted divalent hydrocarbon group optionally containing a heteroatom, with an alkali metal polysulfide represented by the following formula (I-2):

(I-2)

wherein M represents an alkali metal; and x on average is 1.0 to 10.0.

Examples of the halogen atom as H in formula (I-1) include fluorine, chlorine, bromine, and iodine. Among these, chlorine or bromine is preferred. The substituted or unsubstituted divalent hydrocarbon group optionally containing a heteroatom as R is as described above. The dihalogen compound is preferably 2,2'-dichloroethyl ether (bis(2-chloroethyl)ether).

Examples of the alkali metal as M in formula (I-2) include sodium, potassium, and lithium, and x on average is as described above.

The sulfur-containing oligomer may be prepared by, for example, a method (1) of reacting a dihalogen compound of formula (I-1) with an alkali metal polysulfide of formula (I-2) in a two-phase system using a mixture of immiscible solvents including a hydrophilic solvent and a hydrophobic solvent; or a method (2) of adding a dihalogen compound of formula (I-1) to a solution of an alkali metal polysulfide of formula (I-2) at a rate that allows the dihalogen compound to react with the alkali metal polysulfide at the interface between them.

In the methods (1) and (2) or other methods, the dihalogen compound and the alkali metal polysulfide react on a 1:1 equivalent basis. The dihalogen compound and the alkali metal polysulfide are preferably reacted at a ratio (equivalence ratio) of 0.95:1.0 to 1.0:0.95. The reaction temperature is preferably 50° C. to 120° C., more preferably 70° C. to 100° C.

The hydrophilic solvent and hydrophobic solvent (lipophilic solvent) are not particularly limited. Any solvent capable of forming a two-phase reaction system using immiscible solvents may be used. Examples of the hydrophilic solvent include water and alcohols such as methanol, ethanol, ethylene glycol, and diethylene glycol. Examples of the hydrophobic solvent include aromatic hydrocarbons such as toluene, xylene, and benzene; aliphatic hydrocarbons such as pentane and hexane; ethers such as dioxane and dibutyl ether; and esters such as ethyl acetate. The hydrophilic solvents may be used alone, or two or more of these may be used in combination. The same applies to the hydrophobic solvents.

The solvent used in the method (1) preferably includes water, ethanol, and toluene. In the method (2), a mixture of a dihalogen compound of formula (I-1) with toluene is preferably dropwise added to a mixture of an alkali metal polysulfide of formula (I-2) with a solvent including water and/or ethanol at an appropriate rate, and the solvent used may be changed appropriately depending on the type of dihalogen compound.

Catalysts are not necessarily required in the reaction between the dihalogen compound and the alkali metal polysulfide, but may be added as needed. Examples of such catalysts include quaternary ammonium salts, phosphonium salts, and crown ethers. Specific examples include $(CH_3)_4N^+Cl^-$, $(CH_3)_4N^+Br^-$, $(C_4H_9)_4N^+Cl^-$, $(C_4H_9)_4N^+Br^-$, $C_{12}H_{25}N^+(CH_3)_3Br^-$, $(C_4H_9)_4P^+Br^-$, $CH_3P^+(C_6H_5)_3I^-$, $C_{16}H_{33}P^+(C_4H_9)_3Br^-$, 15-crown-5, 18-crown-6, and benzo-18-crown-6.

Moreover, the above-mentioned methods may be used to produce (1) a sulfur-containing oligomer having a weight average molecular weight of 4,000 or more, determined by GPC in chloroform solvent using polystyrene standard oligomers, (2) a sulfur-containing oligomer further containing 10 to 95% by mass of elemental sulfur, (3) a sulfur-containing oligomer further containing a repeating unit of formula (I), or (4) a sulfur-containing oligomer further having an SP value of 12.5 or less.

In view of the aforementioned balance of properties, the amount of the sulfur-containing oligomer per 100 parts by mass of the diene polymer in the rubber composition is preferably 0.2 parts by mass or more, more preferably 0.5 parts by mass or more, still more preferably 1.0 part by mass or more. The upper limit is not particularly critical, but is preferably 10.0 parts by mass or less, more preferably 8.0 parts by mass or less, still more preferably 6.0 parts by mass or less.

For use in cap treads and in view of the balance of initial dry grip performance, durability of dry grip performance, and chipping resistance, the amount of the sulfur-containing oligomer per 100 parts by mass of the diene polymer is preferably 0.2 parts by mass or more, more preferably 0.5 parts by mass or more, still more preferably 1.0 part by mass or more. The upper limit is not particularly critical, but is preferably 10.0 parts by mass or less, more preferably 5.0 parts by mass or less, still more preferably 4.5 parts by mass or less, in view of chipping resistance after aging.

For use in base treads and in view of elongation at break, the amount of the sulfur-containing oligomer per 100 parts by mass of the diene polymer is preferably 1.0 part by mass or more, more preferably 2.0 parts by mass or more, still more preferably 3.0 parts by mass or more, particularly preferably 3.5 parts by mass or more. The upper limit is not particularly critical, but is preferably 10.0 parts by mass or less, more preferably 7.0 parts by mass or less, still more preferably 6.0 parts by mass or less, in view of elongation at break after aging.

Embodiments of the present invention for cap or base treads are described herein. Besides such tread formulations, the present invention may be applied to other tire components, such as sidewalls, wings, clinch apexes, breaker cushions, tie gums, and innerliners, to improve elongation at break.

The rubber composition may further contain other crosslinking agents, such as usual powdered sulfur, insoluble sulfur, or hybrid crosslinking agents, in addition to the sulfur-containing oligomer.

Examples of the sulfur include those usually used in the rubber industry, such as powdered sulfur, precipitated sulfur, colloidal sulfur, insoluble sulfur, highly dispersible sulfur, and soluble sulfur. Commercially available products include products of Tsurumi Chemical Industry Co., Ltd., Karuizawa Sulfur Co., Ltd., Shikoku Chemicals Corporation, Flexsys, Nippon Kanryu Industry Co., Ltd., and Hosoi Chemical Industry Co., Ltd. They may be used alone, or two or more of them may be used in combination.

Any hybrid crosslinking agent may be used including 1,3-bis(citraconimidomethyl)benzene and compounds represented by the following formula:

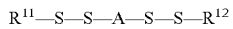

$$R^{11}-S-S-A-S-S-R^{12}$$

wherein A represents a C2-C10 alkylene group, and $R^{11}$ and $R^{12}$ are the same or different and each represent a nitrogen-containing monovalent organic group.

The alkylene group (C2-C10) as A is not particularly limited, and may be a linear, branched, or cyclic alkylene group, preferably a linear alkylene group. The carbon number is preferably 4 to 8. Specific examples of the alkylene group include ethylene, trimethylene, tetramethylene, pentamethylene, hexamethylene, heptamethylene, octamethylene, and decamethylene groups. Among these, a hexamethylene group is preferred.

$R^{11}$ and $R^{12}$ each may be any nitrogen-containing monovalent organic group, preferably one containing at least one aromatic ring, more preferably one containing a linking group represented by N—C(=S)— in which the carbon atom is bonded to the dithio group. $R^{11}$ and $R^{12}$ may be the same as or different from each other, preferably the same.

Examples of such compounds of the above formula include 1,2-bis(N,N'-dibenzylthiocarbamoyldithio)ethane, 1,3-bis(N,N'-dibenzylthiocarbamoyldithio)propane, 1,4-bis(N,N'-dibenzylthiocarbamoyldithio)butane, 1,5-bis(N,N'-dibenzylthiocarbamoyldithio)pentane, 1,6-bis(N,N'-dibenzylthiocarbamoyldithio)hexane, 1,7-bis(N,N'-dibenzylthiocarbamoyldithio)heptane, 1,8-bis(N,N'-dibenzylthiocarbamoyldithio)octane, 1,9-bis(N,N'-dibenzylthiocarbamoyldithio)nonane, and 1,10-bis(N,N'-dibenzylthiocarbamoyldithio)decane. Among these, 1,6-bis(N,N'-dibenzylthiocarbamoyldithio)hexane is preferred.

In the case where the rubber composition further contains other crosslinking agents, such as usual powdered sulfur, insoluble sulfur, or hybrid crosslinking agents, in addition to the sulfur-containing oligomer, it is suitable to appropriately adjust the total amount of crosslinking agents to the amount indicated for the sulfur-containing oligomer.

[Vulcanization Accelerator]

In view of the balance of initial dry grip performance, durability of dry grip performance, and chipping resistance (elongation at break), the rubber composition preferably contains a vulcanization accelerator.

Any type of vulcanization accelerator may be used because the sulfur-containing oligomer promotes uniform dispersion of sulfur. Examples of the vulcanization accelerator include thiazole vulcanization accelerators such as 2-mercaptobenzothiazole, di-2-benzothiazolyl disulfide (DM (2,2'-dibenzothiazolyl disulfide)), and N-cyclohexyl-2-benzothiazylsulfenamide; thiuram vulcanization accelerators such as tetramethylthiuram disulfide (TMTD), tetrabenzylthiuram disulfide (TBzTD), and tetrakis(2-ethylhexyl) thiuram disulfide (TOT-N); sulfenamide vulcanization accelerators such as N-cyclohexyl-2-benzothiazole sulfenamide, N-t-butyl-2-benzothiazolylsulfenamide, N-oxyethylene-2-benzothiazole sulfenamide, and N,N'-diisopropyl-2-benzothiazole sulfenamide; and guanidine vulcanization accelerators such as diphenylguanidine, diorthotolylguanidine, and orthotolylbiguanidine. These vulcanization accelerators may be used alone, or two or more of these may be used in combination. In view of the aforementioned balance of properties, sulfenamide vulcanization accelerators are preferred. For use in cap treads, combinations of sulfenamide vulcanization accelerators and guanidine vulcanization accelerators are preferred.

The amount of the vulcanization accelerator per 100 parts by mass of the diene polymer in the rubber composition is preferably 0.3 parts by mass or more, more preferably 0.5 parts by mass or more, but is preferably 10 parts by mass or less, more preferably 7 parts by mass or less. When the amount falls within the range indicated above, the aforementioned balance of properties tends to be good.

For use in cap treads, the amount of the vulcanization accelerator per 100 parts by mass of the diene polymer is preferably 0.3 parts by mass or more, more preferably 0.5 parts by mass or more, but is preferably 10 parts by mass or less, more preferably 7 parts by mass or less. When the amount falls within the range indicated above, the balance of initial dry grip performance, durability of dry grip performance, and chipping resistance tends to be improved.

For use in base treads, the amount of the vulcanization accelerator per 100 parts by mass of the diene polymer is preferably 0.3 parts by mass or more, more preferably 0.5 parts by mass or more, but is preferably 5.0 parts by mass or less, more preferably 3.0 parts by mass or less. When the amount falls within the range indicated above, elongation at break tends to be improved.

[Diene Polymer]

Any diene polymer may be used in the rubber composition because the sulfur-containing oligomer promotes uniform dispersion of sulfur. Examples of the diene polymer include isoprene-based rubbers, e.g. polyisoprene rubber (IR), epoxidized polyisoprene rubber, hydrogenated polyisoprene rubber, grafted polyisoprene rubber, natural rubber (NR), deproteinized natural rubber (DPNR), highly purified natural rubber (UPNR), epoxidized natural rubber (ENR), hydrogenated natural rubber (HNR), and grafted natural rubber; styrene butadiene rubber (SBR), polybutadiene rubber (BR), styrene isoprene butadiene rubber (SIBR), chloroprene rubber (CR), and acrylonitrile butadiene rubber (NBR). These polymers may be used alone, or two or more of these may be used in combination. In view of the aforementioned balance of properties, SBR, BR, and isoprene-based rubbers are preferred among these. For use in cap treads, combinations of BR and SBR are preferred. For use in base treads, combinations of BR and isoprene-based rubbers are preferred.

Any BR may be used including those usually used in the tire industry, such as BR having a high cis content, BR containing 1,2-syndiotactic polybutadiene crystals (SPB), and polybutadiene rubbers synthesized using rare earth catalysts (rare earth-catalyzed BR). Other examples include tin-modified polybutadiene rubbers (tin-modified BR) which have been modified with tin compounds. Commercially available products include products of Ube Industries, Ltd., JSR Corporation, Asahi Kasei Corporation, Zeon Corporation, and Lanxess. They may be used alone, or two or more of them may be used in combination.

The BR may be an unmodified BR or a BR modified with silica or carbon black.

In view of fuel economy, it is preferably a modified BR. Any modified BR having a functional group interactive with a filler such as silica may be used. For example, it may be a chain end-modified BR obtained by modifying at least one chain end of BR with a compound (modifier) having the functional group described later (chain end-modified BR terminated with the functional group); a backbone-modified BR having the functional group in the backbone; a backbone- and chain end-modified BR having the functional group in both the backbone and chain end (e.g., a backbone- and chain end-modified BR in which the backbone has the functional group and at least one chain end is modified with a compound (modifier) having the functional group; or a chain end-modified BR that has been modified (coupled) with a polyfunctional compound having two or more epoxy groups in the molecule so that hydroxy or epoxy groups are introduced.

Examples of the functional group include amino (preferably amino whose hydrogen atom is replaced with a C1-C6 alkyl group), amide, silyl, alkoxysilyl (preferably C1-C6 alkoxysilyl), isocyanate, imino, imidazole, urea, ether, carbonyl, oxycarbonyl, mercapto, sulfide, disulfide, sulfonyl, sulfinyl, thiocarbonyl, ammonium, imide, hydrazo, azo, diazo, carboxyl, nitryl, pyridyl, alkoxy (preferably C1-C6 alkoxy), hydroxy, oxy, and epoxy groups. These functional groups may be substituted.

In view of tensile properties and abrasion resistance, the BR is preferably a rare earth-catalyzed BR.

The rare earth-catalyzed BR may be a conventional one, and examples include those synthesized using rare earth catalysts (catalysts containing lanthanide rare earth compounds, organic aluminum compounds, aluminoxanes, or halogen-containing compounds, optionally with Lewis bases) and other agents. In particular, it is preferably a polybutadiene rubber synthesized using a neodymium (Nd) catalyst containing a neodymium-containing compound as a lanthanide rare earth compound (Nd-catalyzed BR).

In view of well-balanced properties, the BR preferably has a glass transition temperature (Tg) of −160° C. or higher, more preferably −130° C. or higher, but preferably −60° C. or lower, more preferably −90° C. or lower.

The glass transition temperature as used herein is measured in accordance with JIS K 7121 using a differential scanning calorimeter (Q200, TA Instruments, Japan) at a temperature increase rate of 10° C./rain.

The BR preferably has a cis content of 95% by mass or higher.

The cis content (cis-1,4-linkage content) of the BR as used herein may be measured by infrared absorption spectrometry.

The amount of the BR, if present, based on 100% by mass of the diene polymer is preferably 5% by mass or more, more preferably 10% by mass or more, still more preferably 15% by mass or more, but is preferably 80% by mass or less, more preferably 60% by mass or less. When the amount falls within the range indicated above, the aforementioned balance of properties tends to be improved.

For use in cap treads, the amount of the BR based on 100% by mass of the diene polymer is preferably 5% by mass or more, more preferably 10% by mass or more, still more preferably 15% by mass or more, but is preferably 80% by mass or less, more preferably 60% by mass or less. When the amount falls within the range indicated above, the balance of initial dry grip performance, durability of dry grip performance, and chipping resistance tends to be improved.

For use in base treads, the amount of the BR based on 100% by mass of the diene polymer is preferably 5% by mass or more, more preferably 10% by mass or more, still more preferably 15% by mass or more, but is preferably 60% by mass or less, more preferably 40% by mass or less, still more preferably 30% by mass or less. When the amount falls within the range indicated above, elongation at break tends to be improved.

Any SBR usually used in the tire industry, such as emulsion-polymerized SBR (E-SBR) or solution-polymerized SBR (S-SBR), may be used. Commercially available products include SBR products manufactured or sold by Sumitomo Chemical Co., Ltd., JSR Corporation, Asahi Kasei Corporation, and Zeon Corporation. They may be used alone, or two or more of them may be used in combination.

The SBR may be an unmodified SBR or a modified SBR. Examples of the modified SBR include those to which functional groups as listed for the modified BR have been introduced.

The SBR preferably has a styrene content of 5% by mass or higher, more preferably 10% by mass or higher, still more preferably 15% by mass or higher, but preferably 60% by mass or lower, more preferably 50% by mass or lower, still more preferably 45% by mass or lower, particularly preferably 40% by mass or lower. When the styrene content falls within the range indicated above, the aforementioned balance of properties tends to be improved.

The styrene content of the SBR as used herein is determined by $^1$H-NMR analysis.

In view of well-balanced properties, the SBR preferably has a vinyl content of 10 mol % or higher, more preferably 20 mol % or higher, still more preferably 30 mol % or higher, but preferably 75 mol % or lower, more preferably 70 mol % or lower.

The vinyl content of the SBR as used herein refers to the vinyl content of the butadiene portion (the quantity of vinyl units in the butadiene structure) as determined by $^1$H-NMR analysis.

In order to improve the aforementioned balance of properties, the SBR preferably has a glass transition temperature (Tg) of −90° C. or higher, more preferably −50° C. or higher, but preferably 0° C. or lower, more preferably −10° C. or lower.

In order to improve the aforementioned balance of properties, the SBR preferably has a weight average molecular weight (Mw) of 150,000 or more, more preferably 200,000 or more, still more preferably 220,000 or more, but preferably 2,000,000 or less, more preferably 1,000,000 or less, still more preferably 500,000 or less.

The weight average molecular weight (Mw) of the SBR as used herein may be determined by gel permeation chromatography (GPC) (GPC-8000 series available from Tosoh Corporation, detector: differential refractometer, column: TSKGEL SUPERMULTIPORE HZ-M available from Tosoh Corporation) calibrated with polystyrene standards.

The amount of the SBR, if present, based on 100% by mass of the diene polymer is preferably 20% by mass or more, more preferably 30% by mass or more, but is preferably 95% by mass or less, more preferably 90% by mass or less. When the amount falls within the range indicated above, the aforementioned balance of properties tends to be improved.

For use in cap treads, the amount of the SBR based on 100% by mass of the diene polymer is preferably 20% by mass or more, more preferably 40% by mass or more, but is preferably 95% by mass or less, more preferably 90% by mass or less. When the amount falls within the range indicated above, the balance of initial dry grip performance, durability of dry grip performance, and chipping resistance tends to be improved.

For use in base treads, the amount of the SBR based on 100% by mass of the diene polymer is preferably 20% by mass or less, more preferably 10% by mass or less, and may be 0% by mass. When the amount falls within the range indicated above, the balance of crack growth resistance and elongation at break tends to be improved.

[Filler]

The rubber composition preferably contains carbon black. The aforementioned balance of properties may be significantly improved owing to the reinforcement effect of carbon black. Any carbon black may be used including N134, N110, N220, N234, N219, N339, N330, N326, N351, N550, and N762. Commercially available products include products of Asahi Carbon Co., Ltd., Cabot Japan K.K., Tokai Carbon Co., Ltd., Mitsubishi Chemical Corporation, Lion Corporation, NSCC Carbon Co., Ltd, and Columbia Carbon. They may be used alone, or two or more of them may be used in combination.

The carbon black preferably has a nitrogen adsorption specific surface area ($N_2SA$) of 5 m$^2$/g or more, more preferably 30 m$^2$/g or more, still more preferably 50 m$^2$/g or more. A $N_2SA$ of not less than the lower limit tends to lead to good reinforcement. The $N_2SA$ is also preferably 300 m$^2$/g or less, more preferably 130 m$^2$/g or less. Carbon black having a $N_2SA$ of not more than the upper limit tends to disperse well.

For use in cap treads, the carbon black preferably has a nitrogen adsorption specific surface area ($N_2SA$) of 50 m$^2$/g or more, more preferably 80 m$^2$/g or more, still more preferably 100 m$^2$/g or more. A $N_2SA$ of not less than the lower limit tends to lead to good grip performance. The $N_2SA$ is also preferably 300 m$^2$/g or less, more preferably 150 m$^2$/g or less, still more preferably 130 m$^2$/g or less. Carbon black having a $N_2SA$ of not more than the upper limit tends to disperse well.

For use in base treads, the carbon black preferably has a nitrogen adsorption specific surface area ($N_2SA$) of 5 $m^2/g$ or more, more preferably 30 $m^2/g$ or more, still more preferably 50 $m^2/g$ or more. A $N_2SA$ of not less than the lower limit tends to lead to good elongation at break. The $N_2SA$ is also preferably 100 $m^2/g$ or less, more preferably 80 $m^2/g$ or less. Carbon black having a $N_2SA$ of not more than the upper limit tends to disperse well.

The nitrogen adsorption specific surface area of the carbon black as used herein may be determined in accordance with JIS K 6217-2:2001.

The amount of the carbon black per 100 parts by mass of the diene polymer in the rubber composition is preferably 1 part by mass or more, more preferably 3 parts by mass or more. When the amount is not less than the lower limit, the carbon black tends to provide sufficient reinforcement. The amount is also preferably 80 parts by mass or less, more preferably 50 parts by mass or less. When the amount is not more than the upper limit, the carbon black tends to disperse well.

For use in cap treads, the amount of the carbon black per 100 parts by mass of the diene polymer is preferably 1 part by mass or more, more preferably 3 parts by mass or more. When the amount is not less than the lower limit, the carbon black tends to provide sufficient reinforcement, resulting in good grip performance. The amount is also preferably 30 parts by mass or less, more preferably 20 parts by mass or less, still more preferably 10 parts by mass or less. When the amount is not more than the upper limit, the carbon black tends to disperse well.

For use in base treads, the amount of the carbon black per 100 parts by mass of the diene polymer is preferably 5 parts by mass or more, more preferably 15 parts by mass or more, still more preferably 20 parts by mass or more. When the amount is not less than the lower limit, the carbon black tends to provide sufficient reinforcement, resulting in good elongation at break. The amount is also preferably 80 parts by mass or less, more preferably 50 parts by mass or less, still more preferably 35 parts by mass or less. When the amount is not more than the upper limit, the carbon black tends to disperse well.

In view of fuel economy and elongation at break, the rubber composition preferably contains silica. Non-limiting examples of the silica include dry silica (anhydrous silica) and wet silica (hydrous silica). Wet silica (hydrous silica) is preferred because it has a large number of silanol groups. Commercially available products include products of Degussa, Rhodia, Tosoh Silica Corporation, Solvay Japan, and Tokuyama Corporation. They may be used alone, or two or more of them may be used in combination.

The silica preferably has a nitrogen adsorption specific surface area ($N_2SA$) of 80 $m^2/g$ or more, more preferably 115 $m^2/g$ or more, still more preferably 150 $m^2/g$ or more. A $N_2SA$ of not lower than the lower limit tends to lead to good grip performance. The $N_2SA$ is also preferably 400 $m^2/g$ or less, more preferably 200 $m^2/g$ or less, still more preferably 180 $m^2/g$ or less. Silica having a $N_2SA$ of not lower than the upper limit tends to disperse well.

The $N_2SA$ of the silica is determined by the BET method in accordance with ASTM D3037-93.

The amount of the silica per 100 parts by mass of the diene polymer in the rubber composition is preferably 30 parts by mass or more, more preferably 50 parts by mass or more, still more preferably 70 parts by mass or more. When the amount is not less than the lower limit, the silica tends to provide sufficient reinforcement, resulting in good grip performance. The amount is also preferably 150 parts by mass or less, more preferably 100 parts by mass or less, still more preferably 85 parts by mass or less. When the amount is not more than the upper limit, the silica tends to disperse well.

[Silane Coupling Agent]

The rubber composition containing silica preferably further contains a silane coupling agent.

Any silane coupling agent conventionally used with silica in the rubber industry may be used. Examples include sulfide silane coupling agents such as bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl)tetrasulfide, bis(2-triethoxysilylethyl)trisulfide, bis(4-trimethoxysilylbutyl)trisulfide, bis(3-triethoxysilylpropyl)disulfide, bis(2-triethoxysilylethyl)disulfide, bis(4-triethoxysilylbutyl)disulfide, bis(3-trimethoxysilylpropyl)disulfide, bis(2-trimethoxysilylethyl)disulfide, bis(4-trimethoxysilylbutyl)disulfide, 3-trimethoxysilylpropyl-N,N-dimethylthiocarbamoyl tetrasulfide, 2-triethoxysilylethyl-N,N-dimethylthiocarbamoyl tetrasulfide, and 3-triethoxysilylpropyl methacrylate monosulfide; mercapto silane coupling agents such as 3-mercaptopropyltrimethoxysilane, 2-mercaptoethyltriethoxysilane, and NXT and NXT-Z both available from Momentive; vinyl silane coupling agents such as vinyltriethoxysilane and vinyltrimethoxysilane; amino silane coupling agents such as 3-aminopropyltriethoxysilane and 3-aminopropyltrimethoxysilane; glycidoxy silane coupling agents such as γ-glycidoxypropyltriethoxysilane and γ-glycidoxypropyltrimethoxysilane; nitro silane coupling agents such as 3-nitropropyltrimethoxysilane and 3-nitropropyltriethoxysilane; and chloro silane coupling agents such as 3-chloropropyltrimethoxysilane and 3-chloropropyltriethoxysilane. Commercially available products include products of Degussa, Momentive, Shin-Etsu Silicone, Tokyo Chemical Industry Co., Ltd., AZmax. Co., Dow Corning Toray Co., Ltd., and Evonik. These silane coupling agents may be used alone, or two or more of these may be used in combination. In view of the aforementioned balance of properties, sulfide silane coupling agents or mercapto silane coupling agents are preferred among these.

The amount of the silane coupling agent, if present, per 100 parts by mass of the silica in the rubber composition is preferably 2 parts by mass or more, more preferably 5 parts by mass or more. When the amount is not less than the lower limit, the added silane coupling agent tends to produce its effect. The amount is also preferably 20 parts by mass or less, more preferably 15 parts by mass or less. When the amount is not more than the upper limit, an effect commensurate with the added amount tends to be produced, and good processability during kneading also tends to be obtained.

[Resin]

The rubber composition may contain a resin. Particularly when the rubber composition containing a resin is used for cap treads, it provides good grip performance.

The resin preferably has a softening point of −10° C. to 170° C. A resin having a softening point within the range indicated above tends to have sufficiently good compatibility with the diene polymer so that the effects of the present invention can be suitably achieved. The softening point is more preferably 0° C. or higher, still more preferably 10° C. or higher, but is more preferably 160° C. or lower, still more preferably 150° C. or lower, further preferably 140° C. or lower.

The softening point as used herein is determined in accordance with JIS K 6220:2001 using a ring and ball softening point measuring apparatus and defined as the temperature at which the ball drops down.

The resin preferably has a glass transition temperature (Tg) of −40° C. to 100° C. A resin having a softening point within the range indicated above tends to have sufficiently good compatibility with the diene polymer so that the effects of the present invention can be suitably achieved. The glass transition temperature is more preferably −30° C. or higher.

Examples of the resin include aromatic vinyl polymers, coumarone-indene resins, indene resins, rosin resins, terpenic resins, and acrylic resins. Commercially available products include products of Maruzen Petrochemical Co., Ltd., Sumitomo Bakelite Co., Ltd., Yasuhara Chemical Co., Ltd., Tosoh Corporation, Rutgers Chemicals, BASF, Arizona Chemical, Nitto Chemical Co., Ltd., Nippon Shokubai Co., Ltd., JX Nippon Oil & Energy Corporation, Arakawa Chemical Industries, Ltd., Taoka Chemical Co., Ltd., Toagosei Co., Ltd., and Harima Chemicals Group, Inc. They may be used alone, or two or more of them may be used in combination. Among these, aromatic vinyl polymers, coumarone-indene resins, terpenic resins, and rosin resins are preferred.

The aromatic vinyl polymers refer to resins produced by polymerizing α-methylstyrene and/or styrene. Examples include homopolymers of styrene or α-methylstyrene, and copolymers of α-methylstyrene and styrene. Among these, copolymers of α-methylstyrene and styrene are preferred.

The coumarone-indene resins refer to resins that contain coumarone and indene as the primary monomer components forming the skeleton (backbone) of the resins. Examples of monomer components other than coumarone and indene which may be contained in the skeleton include styrene, α-methylstyrene, methylindene, and vinyltoluene.

The indene resins refer to resins that contain indene as the primary monomer component forming the skeleton (backbone) of the resins.

Examples of the rosin resins include rosin-based resins typified by natural rosins, polymerized rosins, modified rosins, and ester compounds thereof, and hydrogenated products thereof.

Examples of the terpenic resins include polyterpene resins produced by polymerizing terpene compounds; aromatic modified terpene resins produced by polymerizing terpene compounds and aromatic compounds; and hydrogenated products of the foregoing resins.

The polyterpene resins refer to resins produced by polymerizing terpene compounds. The term "terpene compound" refers to a hydrocarbon having a composition represented by $(C_5H_8)_n$ or an oxygen-containing derivative thereof, each of which has a terpene backbone and is classified as, for example, a monoterpene $(C_{10}H_{16})$, sesquiterpene $(C_{15}H_{24})$, or diterpene $(C_{20}H_{32})$. Examples of the terpene compound include α-pinene, β-pinene, dipentene, limonene, myrcene, alloocimene, ocimene, α-phellandrene, α-terpinene, γ-terpinene, terpinolene, 1,8-cineole, 1,4-cineole, α-terpineol, β-terpineol, and γ-terpineol.

Examples of the polyterpene resins include resins made from the above-listed terpene compounds, such as pinene resins, limonene resins, dipentene resins, and pinene-limonene resins. Preferred among these are pinene resins because their polymerization reaction is simple, and also because they are made from natural rosin and thus available at low cost. Pinene resins, which usually contain two isomers, i.e. α-pinene and β-pinene, are classified into β-pinene resins mainly containing β-pinene and α-pinene resins mainly containing α-pinene according to the components contained in the resins.

Examples of the aromatic modified terpene resins include terpene phenol resins made from the above-listed terpene compounds and phenolic compounds; and terpene styrene resins made from the above-listed terpene compounds and styrenic compounds. Terpene phenol styrene resins made from the above-listed terpene compounds, phenolic compounds, and styrenic compounds may also be used. Examples of the phenolic compounds include phenol, bisphenol A, cresol, and xylenol. Examples of the styrenic compounds include styrene and α-methylstyrene.

Examples of the acrylic resins include styrene acrylic resins such as styrene acrylic resins containing carboxyl groups and produced by copolymerization of aromatic vinyl monomer components and acrylic monomer components. In particular, solventless styrene acrylic resins containing carboxyl groups are suitable.

The solventless styrene acrylic resins containing carboxyl groups refer to (meth)acrylic resins (polymers) synthesized by high temperature continuous polymerization (high temperature continuous bulk polymerization as described in, for example, U.S. Pat. No. 4,414,370, JP S59-6207 A, JP H5-58005 B, JP H1-313522 A, U.S. Pat. No. 5,010,166, and annual research report TREND 2000 issued by Toagosei Co., Ltd., vol. 3, pp. 42-45, all of which are incorporated herein by reference.) using no or minimal amounts of auxiliary raw materials such as polymerization initiators, chain transfer agents, and organic solvents. Herein, the term "(meth)acrylic" means methacrylic and acrylic.

Examples of the acrylic monomer components of the acrylic resins include (meth)acrylic acid and (meth)acrylic acid derivatives such as (meth)acrylic acid esters (alkyl esters such as 2-ethylhexyl acrylate, aryl esters, aralkyl esters, etc.), (meth)acrylamide, and (meth)acrylamide derivatives. The term "(meth)acrylic acid" is a general term for acrylic acid and methacrylic acid.

Examples of the aromatic vinyl monomer components of the acrylic resins include aromatic vinyls such as styrene, α-methylstyrene, vinyltoluene, vinylnaphthalene, divinylbenzene, trivinylbenzene, and divinylnaphthalene.

Moreover, other monomer components may be used together with (meth)acrylic acid or (meth)acrylic acid derivatives, and aromatic vinyls as the monomer components forming the acrylic resins.

The amount of the resin per 100 parts by mass of the diene polymer in the rubber composition is preferably 30 parts by mass or less. When the amount falls within the range indicated above, the effects of the present invention tend to be suitably achieved. The amount is more preferably 25 parts by mass or less, still more preferably 22 parts by mass or less, particularly preferably 20 parts by mass or less. The lower limit is not particularly critical, but the amount of the resin, if present, is preferably 1 part by mass or more, more preferably 5 parts by mass or more, still more preferably 10 parts by mass or more.

[Oil]

The rubber composition may contain an oil. The incorporation of an oil improves processability and provides flexibility to tires, and therefore the effects of the present invention can be well achieved.

The oil may be, for example, a process oil, vegetable fat or oil, or a mixture thereof. Examples of the process oil include paraffinic process oils, aromatic process oils, and naphthenic process oils. Examples of the vegetable fat or oil include castor oil, cotton seed oil, linseed oil, rapeseed oil, soybean oil, palm oil, coconut oil, peanut oil, rosin, pine oil, pine tar, tall oil, corn oil, rice oil, safflower oil, sesame oil, olive oil, sunflower oil, palm kernel oil, camellia oil, jojoba oil, macadamia nut oil, and tung oil. Commercially available products include products of Idemitsu Kosan Co., Ltd., Sankyo Yuka Kogyo K.K., JX Nippon Oil & Energy Corporation, Olisoy, H&R, Hokoku Corporation, Showa Shell Sekiyu K.K., and Fuji Kosan Co., Ltd. They may be used alone, or two or more of them may be used in combination. Among these, aromatic process oils are preferred in order to suitably achieve the effects of the present invention.

The amount of the oil per 100 parts by mass of the diene polymer in the rubber composition is preferably 1 part by mass or more, more preferably 3 parts by mass or more, but is preferably 50 parts by mass or less, more preferably 30 parts by mass or less. When the amount falls within the range indicated above, the effects of the present invention can be suitably achieved.

The amount of the oil as used herein includes the amount of the oils contained in oil extended rubbers.

For use in cap treads, the amount of the oil per 100 parts by mass of the diene polymer is preferably 1 part by mass or more, more preferably 3 parts by mass or more, but is preferably 50 parts by mass or less, more preferably 30 parts by mass or less. When the amount falls within the range indicated above, the balance of processability, initial dry grip performance, durability of dry grip performance, and chipping resistance tends to be improved.

For use in base treads, the amount of the oil per 100 parts by mass of the diene polymer is preferably 1 part by mass or more, more preferably 3 parts by mass or more, but is preferably 20 parts by mass or less, more preferably 10 parts by mass or less. When the amount falls within the range indicated above, processability and elongation at break tend to be improved.

Moreover, the combined amount of the resin and the oil per 100 parts by mass of the diene polymer in the rubber composition is preferably 1 part by mass or more, more preferably 3 parts by mass or more, but is preferably 50 parts by mass or less, more preferably 30 parts by mass or less. When the combined amount falls within the range indicated above, the effects of the present invention can be suitably achieved.

For use in cap treads, the combined amount of the resin and the oil per 100 parts by mass of the diene polymer is preferably 10 parts by mass or more, more preferably 20 parts by mass or more, but is preferably 50 parts by mass or less, more preferably 30 parts by mass or less. When the combined amount falls within the range indicated above, the balance of initial dry grip performance, durability of dry grip performance, and chipping resistance tends to be improved.

For use in base treads, the combined amount of the resin and the oil per 100 parts by mass of the diene polymer is preferably 1 part by mass or more, more preferably 3 parts by mass or more, but is preferably 15 parts by mass or less, more preferably 10 parts by mass or less. When the combined amount falls within the range indicated above, elongation at break tends to be improved.

[Wax]

The rubber composition may contain a wax. The wax may suitably be a paraffin wax, for example. The term "paraffin wax" may be defined as an alkane having 20 or more carbon atoms. The paraffin wax may mainly include a normal alkane (linear alkane) having 20 or more carbon atoms (hereinafter, the normal alkane having 20 or more carbon atoms may also be referred to simply as "normal alkane") in order to obtain excellent ozone resistance (ozone cracking resistance) in a wide temperature range. In other words, paraffin waxes mainly including normal alkanes may be suitably used in the present invention. Commercially available products include products of Ouchi Shinko Chemical Industrial Co., Ltd., Nippon Seiro Co., Ltd., and Seiko Chemical Co., Ltd. The paraffin waxes may be used alone, or two or more of the paraffin waxes and other types of waxes having different carbon number distributions or proportions of normal alkanes (proportions of normal alkanes to total alkanes) may be used in combination.

Non-limiting examples of such paraffin waxes including normal alkanes include paraffin waxes including C20-C55 normal alkanes. In particular, preferred are paraffin waxes containing 70% by mass or more, more preferably 80% by mass or more of normal alkanes.

The amount of the paraffin wax per 100 parts by mass of the diene polymer in the rubber composition is preferably 0.3 to 5.0 parts by mass, more preferably 0.8 to 3.0 parts by mass, still more preferably 1.0 to 2.0 parts by mass.

[Antioxidant]

The rubber composition preferably contains an antioxidant.

Non-limiting examples of the antioxidant include: naphthylamine antioxidants such as phenyl-$\alpha$-naphthylamine; diphenylamine antioxidants such as octylated diphenylamine and 4,4'-bis($\alpha,\alpha$'-dimethylbenzyl)diphenylamine; p-phenylenediamine antioxidants such as N-isopropyl-N'-phenyl-p-phenylenediamine, N-(1,3-dimethylbutyl)-N'-phenyl-p-phenylenediamine, and N,N'-di-2-naphthyl-p-phenylenediamine; quinoline antioxidants such as 2,2,4-trimethyl-1,2-dihydroquinoline polymer; monophenolic antioxidants such as 2,6-di-t-butyl-4-methylphenol and styrenated phenol; and bis-, tris-, or polyphenolic antioxidants such as tetrakis-[methylene-3-(3',5'-di-t-butyl-4'-hydroxyphenyl)-propionate]methane. Commercially available products include products of Seiko Chemical Co., Ltd., Sumitomo Chemical Co., Ltd., Ouchi Shinko Chemical Industrial Co., Ltd., and Flexsys. These antioxidants may be used alone, or two or more of these may be used in combination. In order to obtain good ozone resistance (ozone cracking resistance) and to more suitably achieve the effects of the present invention, p-phenylenediamine antioxidants are preferred among these, with N-(1,3-dimethylbutyl)-N'-phenyl-p-phenylenediamine being more preferred.

The amount of the antioxidant per 100 parts by mass of the diene polymer in the rubber composition is preferably 0.3 parts by mass or more, more preferably 1 part by mass or more, still more preferably 2 parts by mass or more, but is preferably 7 parts by mass or less, more preferably 6 parts by mass or less, still more preferably 5 parts by mass or less. When the amount falls within the range indicated above, the effects of the present invention can be sufficiently achieved.

[Fatty Acid]

The rubber composition preferably contains a fatty acid such as stearic acid, palmitic acid, or oleic acid.

The stearic acid may be a conventional one, and examples include products of NOF Corporation, Kao Corporation, Wako Pure Chemical Industries, Ltd., and Chiba Fatty Acid Co., Ltd.

The amount of the fatty acid per 100 parts by mass of the diene polymer in the rubber composition is preferably 0.5 parts by mass or more, more preferably 1 part by mass or more, but is preferably 10 parts by mass or less, more preferably 5 parts by mass or less. When the amount falls within the range indicated above, the effects of the present invention tend to be well achieved.

[Zinc Oxide]

The rubber composition preferably contains zinc oxide.

The zinc oxide may be a conventional one, and examples include products of Mitsui Mining & Smelting Co., Ltd., Toho Zinc Co., Ltd., HakusuiTech Co., Ltd., Seido Chemical Industry Co., Ltd., and Sakai Chemical Industry Co., Ltd.

The amount of the zinc oxide per 100 parts by mass of the diene polymer in the rubber composition is preferably 0.5 parts by mass or more, more preferably 1 part by mass or more, but is preferably 5 parts by mass or less, more preferably 4 parts by mass or less. When the amount falls within the range indicated above, the effects of the present invention tend to be well achieved.

The rubber composition may contain other additives usually used in the tire industry, in addition to the above-mentioned components. Examples of such additives include fillers such as calcium carbonate, talc, alumina, clay, aluminum hydroxide, aluminum oxide, mica, and magnesium sulfate; processing aids such as plasticizers and lubricants; surfactants; and other softeners.

The rubber composition may be prepared by known methods. For example, it may be prepared by kneading the components using a rubber kneading machine such as an open roll mill, a Banbury mixer, or a kneader, and vulcanizing the kneaded mixture.

The kneading conditions are as follows. The kneading temperature in a base kneading step in which the additives other than crosslinking agents (vulcanizing agents) and vulcanization accelerators are kneaded is usually 120° C. to 180° C., preferably 130° C. to 170° C. The kneading temperature in a final kneading step in which vulcanizing agents and vulcanization accelerators are kneaded is usually 120° C. or lower, and preferably 85° C. to 110° C. Moreover, the composition obtained after kneading of vulcanizing agents and vulcanization accelerators is usually vulcanized by, for example, press vulcanization. The vulcanization temperature is usually 140° C. to 190° C., preferably 150° C. to 185° C.

The rubber composition may be suitably used for treads (cap treads and base treads), and it may also be used in tire components other than treads, such as sidewalls, undertreads, clinch apexes, bead apexes, breaker cushion rubbers, carcass cord topping rubbers, insulations, chafers, and innerliners, as well as side reinforcement layers of run-flat tires.

The pneumatic tire of the present invention may be produced using the rubber composition by conventional methods.

Specifically, the unvulcanized rubber composition containing the components may be extruded into the shape of a tire component such as a tread, and assembled with other tire components on a tire building machine in a usual manner to build an unvulcanized tire, which may then be heated and pressurized in a vulcanizer to give a tire.

The pneumatic tire may be used as, for example, a tire for passenger vehicles, large passenger vehicles, large SUVs, heavy load vehicles such as trucks and buses, light trucks, or motorcycles, or as a racing tire (high performance tire). It may be suitably used as a racing tire, among others.

EXAMPLES

The present invention is specifically described below with reference to, but not limited to, examples.

Production Example 1: Synthesis of Sulfur-Containing Oligomer 1 (Rubbery)

A flask completely purged with an inert gas such as nitrogen gas or argon gas was charged with 104.4 g of a 30% aqueous solution of sodium polysulfide (0.180 mol), 150 g of ion exchanged water, and 150 g of ethanol, and they were stirred and heated to 90° C. Thereafter, 25.0 g of bis(2-chloroethyl)ether (0.175 mol) diluted with 100 g of toluene was dropwise added to the mixture over two hours, and the reaction was further continued for three hours at the same temperature. Then, the organic layer was separated, followed by vacuum concentration and drying at 90° C. to give 27.3 g of a target oligomer.

The sulfur-containing oligomer 1 (rubbery) thus obtained had a Mw of 21,000, an elemental sulfur content of 55% by mass, and an SP value of 11.1 and contained a repeating unit of formula (I) wherein R=—$(CH_2)_2O(CH_2)_2$— and x=4.0 on average.

Production Example 2: Synthesis of Sulfur-Containing Oligomer 2 (Rubbery)

A flask completely purged with an inert gas such as nitrogen gas or argon gas was charged with 104.4 g of a 30% aqueous solution of sodium polysulfide (0.180 mol), 150 g of ion exchanged water, 150 g of ethanol, 100 g of toluene, and 25.0 g of bis(2-chloroethyl)ether (0.175 mol), and they were stirred and heated, and then reacted at 90° C. for five hours. Then, the organic layer was separated, followed by vacuum concentration and drying at 90° C. to give 26.0 g of a target oligomer.

The sulfur-containing oligomer 2 (rubbery) thus obtained had a Mw of 17,000, an elemental sulfur content of 55% by mass, and an SP value of 11.1 and contained a repeating unit of formula (I) wherein R=—$(CH_2)_2O(CH_2)_2$— and x=4.0 on average.

Production Example 3: Synthesis of Sulfur-Containing Oligomer 3 (Rubbery)

A flask completely purged with an inert gas such as nitrogen gas or argon gas was charged with 104.4 g of a 30% aqueous solution of sodium polysulfide (0.180 mol), 150 g of ion exchanged water, 150 g of ethanol, and further 1.25 g of tetrabutylammonium chloride (TBAB) as a reaction catalyst, and they were stirred and heated to 90° C. Thereafter, 25.0 g of bis(2-chloroethyl)ether (0.175 mol) diluted with 100 g of toluene was dropwise added to the mixture over two hours, and the reaction was further continued for three hours at the same temperature. Then, the organic layer was separated, followed by vacuum concentration and drying at 90° C. to give 28.5 g of a target oligomer.

The sulfur-containing oligomer 3 (rubbery) thus obtained had a Mw of 42,000, an elemental sulfur content of 55% by mass, and an SP value of 11.1 and contained a repeating unit of formula (I) wherein R=—$(CH_2)_2O(CH_2)_2$— and x=4.0 on average.

Production Example 4: Synthesis of Sulfur-Containing Oligomer 4 (Liquid)

A flask completely purged with an inert gas such as nitrogen gas or argon gas was charged with 104.4 g of a 30% aqueous solution of sodium polysulfide (0.180 mol), 150 g of ion exchanged water, and further 1.25 g of tetrabutylammonium chloride (TBAB) as a reaction catalyst, and they were stirred and heated to 90° C. Thereafter, 25.0 g of bis(2-chloroethyl)ether (0.175 mol) diluted with 100 g of toluene was dropwise added to the mixture over two hours, and the reaction was further continued for three hours at the same temperature. Then, the organic layer was separated, followed by vacuum concentration and drying at 90° C. to give 25.5 g of a target oligomer.

The sulfur-containing oligomer 4 (liquid) thus obtained had a Mw of 2,670, an elemental sulfur content of 55% by mass, and an SP value of 11.1 and contained a repeating unit of formula (I) wherein R=—(CH$_2$)$_2$O(CH$_2$)$_2$— and x=4.0 on average.

Production Example 5: Synthesis of Sulfur-Containing Oligomer 5 (Liquid)

A flask completely purged with an inert gas such as nitrogen gas or argon gas was charged with 104.4 g of a 30% aqueous solution of sodium polysulfide (0.180 mol) and 150 g of ion exchanged water, and they were stirred and heated to 90° C. Thereafter, 25.0 g of bis(2-chloroethyl)ether (0.175 mol) diluted with 100 g of toluene was dropwise added to the mixture over two hours, and the reaction was further continued for three hours at the same temperature. Then, the organic layer was separated, followed by vacuum concentration and drying at 90° C. to give 25.0 g of a target oligomer.

The sulfur-containing oligomer 5 (liquid) thus obtained had a Mw of 1,250, an elemental sulfur content of 55% by mass, and an SP value of 11.1 and contained a repeating unit of formula (I) wherein R=—(CH$_2$)$_2$O(CH$_2$)$_2$— and x=4.0 on average.

Production Example 6: Synthesis of Sulfur-Containing Oligomer 6 (Liquid)

An amount of 28.1 g of 1,2-bis(2-chloroethoxy)ethane (0.15 mol) and 89.76 g of a 30% aqueous solution of sodium polysulfide (Na$_2$S$_4$) (0.155 mol) were reacted in a mixture of immiscible solvents consisting of 150 g of water and 100 g of toluene at 90° C. for five hours. After the completion of the reaction, the organic phase was separated, followed by concentration under reduced pressure at 90° C. to give 34.3 g (yield: 94%) of a cyclic polysulfide (sulfur-containing oligomer 6 (liquid)).

The sulfur-containing oligomer 6 (liquid) thus obtained had a Mw of 500, an elemental sulfur content of 55% by mass, and an SP value of 11.1 and contained a repeating unit of formula (I) wherein R=—(CH$_2$)$_2$O(CH$_2$)$_2$O(CH$_2$)$_2$—, x=4 on average, and n=1 to 5 on average.

Production Example 7: Synthesis of Sulfur-Containing Oligomer 7 (Rubbery)

A flask completely purged with an inert gas such as nitrogen gas or argon gas was charged with 104.4 g of a 30% aqueous solution of sodium polysulfide (0.180 mol) and 150 g of ion exchanged water, and they were stirred and heated to 90° C. Thereafter, 27.13 g of 1,6-dichlorohexane (0.175 mol) diluted with 100 g of toluene was dropwise added to the mixture over two hours, and the reaction was further continued for three hours at the same temperature. Then, the organic layer was separated, followed by vacuum concentration and drying at 90° C. to give 28.0 g of a target oligomer.

The sulfur-containing oligomer 7 (rubbery) thus obtained had a Mw of 16,000, an elemental sulfur content of 58% by mass, and an SP value of 11.1 and contained a repeating unit of formula (I) wherein R=—(CH$_2$)$_5$— and x=4 on average.

With regard to the structure of the sulfur-containing oligomers 1 to 3 used in the examples, each oligomer seems to be a compound containing a repeating unit as shown in the following formula VIII:

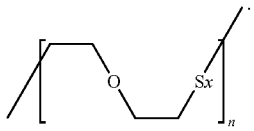

(x represents an integer of 1 to 6.)

With regard to the structure of the sulfur-containing oligomers 4 and 5, each oligomer seems to be a mixture of the compound of formula VIII and/or a compound represented by the following formula IX (mixture of VIII and/or IX)

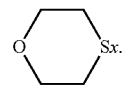

(x represents an integer of 1 to 6.)

With regard to the structure of the sulfur-containing oligomer 6, the oligomer seems to be a mixture of a compound represented by the following formula X and/or a ring-opened oligomer (straight chain)

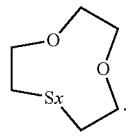

(x represents an integer of 1 to 6.)

With regard to the structure of the sulfur-containing oligomer 7, the oligomer seems to be a compound containing a repeating unit as shown in the following formula XI:

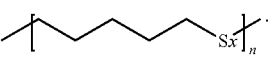

(x represents an integer of 1 to 6.)

The chemicals used in the examples and comparative examples are listed below.

NR: TSR20

SBR: non-oil extended SBR (styrene content: 20% by mass, vinyl content: 66 mol %, Tg: −23° C., Mw: 240,000)

BR: BUNA-CB25 available from Lanxess (rare earth-catalyzed BR synthesized using a Nd catalyst, cis content: 97% by mass, Tg: −110° C.)

Carbon black 1: SHOBLACK N220 available from Cabot Japan K.K. (N$_2$SA: 114 m$^2$/g)

Carbon black 2: SHOBLACK N351H available from Cabot Japan K.K. (N$_2$SA: 69 m$^2$/g)

Silica: Ultrasil VN3 available from Degussa (N$_2$SA: 175 m$^2$/g)

Silane coupling agent: Si75 bis(3-triethoxysilylpropyl) disulfide available from Evonik Resin 1: YS resin TO-125 available from Yasuhara Chemical Co., Ltd. (aromatic modified terpene resin, softening point: 125° C., Tg: 64° C.)

Resin 2: HARIESTER TF available from Harima Chemicals Group, Inc. (rosin ester resin, softeningpoint: 80° C., Tg: 40° C.)

Resin 3: Sylvatraxx 4401 available from Arizona Chemical (copolymer of α-methylstyrene and styrene, softening point: 85° C., Tg: 43° C.)

Resin 4: NOVARES C10 available from Rutgers Chemicals (liquid coumarone-indene resin, softening point: 10° C., Tg: −30° C.)

Wax: Ozoace 0355 available from Nippon Seiro Co., Ltd. (paraffin wax, melting point: 70° C., normal alkane content: 85% by mass)

Stearic acid: stearic acid "TSUBAKI" available from NOF Corporation (melting point: 53° C.)

Oil: aromatic process oil

Antioxidant: N-(1,3-dimethylbutyl)-N'-phenyl-p-phenylenediamine (melting point: 45° C.)

Zinc oxide: zinc oxide #2 available from Mitsui Mining & Smelting Co., Ltd.

Sulfur-containing oligomer 1 (rubbery): the oligomer produced in Production Example 1

Sulfur-containing oligomer 2 (rubbery): the oligomer produced in Production Example 2

Sulfur-containing oligomer 3 (rubbery): the oligomer produced in Production Example 3

Sulfur-containing oligomer 4 (liquid): the oligomer produced in Production Example 4

Sulfur-containing oligomer 5 (liquid): the oligomer produced in Production Example 5

Sulfur-containing oligomer 6 (liquid): the oligomer produced in Production Example 6

Sulfur-containing oligomer 7 (rubbery): the oligomer produced in Production Example 7

Hybrid crosslinking agent 1: 1,3-bis(citraconimidomethyl) benzene

Hybrid crosslinking agent 2: 1,6-bis(N,N'-dibenzyl-thiocarbamoyldithio)hexane

Sulfur: 5% oil-containing powdered sulfur available from Hosoi Chemical Industry Co., Ltd Vulcanization accelerator 1: N-tert-butyl-2-benzothiazolylsulfenamide (melting point: 103° C.)

Vulcanization accelerator 2: diphenylguanidine (melting point: 145° C.)

The styrene content, vinyl content, and Mw of the SBR were analyzed as described below.

(Structural Identification)

The structure (styrene content, vinyl content) of the SBR was identified using a JNM-ECA series system available from Jeol Ltd. A solution of 0.1 g of the polymer dissolved in 15 mL of toluene was slowly poured into 30 mL of methanol for reprecipitation, and the precipitate was dried under reduced pressure and then analyzed.

The Mw measurement and structural identification of the sulfur-containing oligomers were performed as described below.

(Weight Average Molecular Weight (Mw), Structural Identification)

The Mw was determined by gel permeation chromatography (GPC) using the apparatus and conditions indicated below, followed by calibration with polystyrene standards.

Moreover, the fractions corresponding to the peaks in the chromatogram obtained by GPC were separated and then analyzed by gas chromatography-mass spectrometry (GC/MS) to determine the molecular weight of the peak fractions.

Furthermore, the sulfur-containing oligomers were subjected to $^{13}C$ NMR analysis.

Then, the structure of the sulfur-containing oligomers was identified based on the $^{13}C$ NMR analysis results, the weight average molecular weights determined by GPC, and the molecular weights of the peak fractions determined by GC/MS.

(1) Pretreatment

Each sample was dissolved in a solvent and then filtered through a 0.45-μm membrane filter to prepare a solution for analysis.

(2) Apparatus and Measurement Conditions

Apparatus: GPC-8000 series available from Tosoh Corporation

Column: TSKGel SuperAWM-H×2+SuperAW2500×1 (6.0 mm i.d.×150 mm, 3 columns) available from Tosoh Corporation Solvent: chloroform Flow rate: 0.6 mL/min Detector: RI detector Column temperature: 40° C.

Injection amount: 20 μL

Molecular weight standards: polystyrene standards

Examples and Comparative Examples

The chemicals other than the crosslinking agents and vulcanization accelerators used in each of the formulations shown in Table 1 or 2 were kneaded for five minutes at 150° C. using a 1.7-L Banbury mixer (Kobe Steel, Ltd.) to give a kneaded mixture. To the kneaded mixture were added the crosslinking agents and vulcanization accelerators, and they were kneaded for five minutes at a roll temperature adjusted to 70° C. using an open roll mill to give an unvulcanized rubber composition. The unvulcanized rubber composition was formed into the shape of a cap tread or base tread and assembled with other tire components to build an unvulcanized tire. The unvulcanized tire was press-vulcanized at 170° C. for 10 minutes to obtain a test tire (size: 215/45R17). Moreover, rubber specimens were cut out of the cap tread or base tread part of the test tire and subjected to evaluation.

The test tires prepared as above were evaluated as described below. Tables 1 and 2 show the results (standard in Table 1: Comparative Example 1; standard in Table 2: Comparative Example 14).

(Initial/Late Dry Grip Performance)

A set of the test tires was mounted on a front-engine, rear-wheel-drive car of 2,000 cc displacement made in Japan. The car was run 15 laps around a test track under dry asphalt road conditions. The initial dry grip performance was evaluated based on the average of the first to fifth lap times, and the late dry grip performance was evaluated based on the average of the tenth to fifteenth lap times. The results are expressed as an index. A higher index indicates better initial dry grip performance or late dry grip performance. In Table 1, tires with an index of higher than 105 are considered good.

(Chipping Resistance)

A set of the test tires was mounted on a front-engine, rear-wheel-drive car of 2,000 cc displacement made in Japan. The car was run 10 laps around a rough test track for rocky terrains. The degree of chipping in the tread rubber was assessed by appearance and expressed as an index. A higher index indicates better chipping resistance. In Table 1, tires with an index of 110 or higher are considered good.

(Tensile Testing)

No. 3 dumbbell-shaped specimens prepared from each vulcanized rubber composition were subjected to tensile testing (at room temperature) in accordance with JIS K 6251 "Rubber, vulcanized or thermoplastic—Determination of tensile stress-strain properties" to measure the elongation at break (tensile elongation; EB[%]) of the vulcanized rubber composition. In Table 1, an EB value of higher than 500% is considered good. In Table 2, the EB values are expressed as an index, and an index of higher than 110 is considered good.

(Overall Properties)

In Table 1, an average of the initial dry grip performance index, late dry grip performance index, and chipping resistance index is calculated and displayed as the overall properties. An overall properties value of 107 or higher is considered good.

TABLE 1

| | | Cap tread | | | | | | | | | |
|---|---|---|---|---|---|---|---|---|---|---|---|
| | | Example | | | | | | | | | |
| | | 1 | 2 | 3 | 4 | 5 | 6 | 7 | 8 | 9 | 10 |
| Formulation (parts by mass) | NR | | | | | | | | | | |
| | SBR (non-oil extended, Styr20, Vynl66, Tg −23° C., Mw 240,000) | 80 | 80 | 80 | 80 | 80 | 80 | 80 | 80 | 80 | 60 |
| | BR (Nd-catalyzed BR, Tg −110° C.) | 20 | 20 | 20 | 20 | 20 | 20 | 20 | 20 | 20 | 40 |
| | Carbon black 1 (BET 114) | 5 | 5 | 5 | 5 | 5 | 5 | 5 | 5 | 5 | 5 |
| | Silica (BET 175) | 75 | 75 | 75 | 75 | 75 | 75 | 75 | 75 | 75 | 75 |
| | Silane coupling agent | 6 | 6 | 6 | 6 | 6 | 6 | 6 | 6 | 6 | 6 |
| | Resin 1 (softening point 125° C., Tg 64° C.) | | | | | | 20 | | | | 20 |
| | Resin 2 (softening point 80° C., Tg 40° C.) | | | | | | | 20 | | | |
| | Resin 3 (softening point 85° C., Tg 43° C.) | | | | | | | | 20 | | |
| | Resin 4 (softening point 10° C., Tg −30° C.) | | | | | | | | | 20 | |
| | Wax | 1.5 | 1.5 | 1.5 | 1.5 | 1.5 | 1.5 | 1.5 | 1.5 | 1.5 | 1.5 |
| | Stearic acid | 2 | 2 | 2 | 2 | 2 | 2 | 2 | 2 | 2 | 2 |
| | Process oil | 27 | 27 | 27 | 27 | 27 | 7 | 7 | 7 | 7 | 7 |
| | Antioxidant | 2 | 2 | 2 | 2 | 2 | 2 | 2 | 2 | 2 | 2 |
| | Zinc oxide | 2.5 | 2.5 | 2.5 | 2.5 | 2.5 | 2.5 | 2.5 | 2.5 | 2.5 | 2.5 |
| | Sulfur-containing oligomer 1 (sulfur content 55%, Mw 21,000, SP value 11.1) | 2.9 | | | 3.6 | 1.0 | 2.9 | 2.9 | 2.9 | 2.9 | 2.9 |
| | Sulfur-containing oligomer 2 (sulfur content 55%, Mw 17,000, SP value 11.1) | | 2.9 | | | | | | | | |
| | Sulfur-containing oligomer 3 (sulfur content 55%, Mw 42,000, SP value 11.1) | | | 2.9 | | | | | | | |
| | Sulfur-containing oligomer 4 (liquid) (sulfur content 55%, Mw 2,670, SP value 11.1) | | | | | | | | | | |
| | Sulfur-containing oligomer 5 (liquid) (sulfur content 55%, Mw 1,250, SP value 11.1) | | | | | | | | | | |
| | Sulfur-containing oligomer 6 (liquid) (sulfur content 55%, Mw 500, SP value 11.1) | | | | | | | | | | |
| | Sulfur-containing oligomer 7 (sulfur content 58%, Mw 16,000, SP value 11.1) | | | | | | | | | | |
| | Hybrid crosslinking agent 1 | | | | | | | | | | |
| | Hybrid crosslinking agent 2 | | | | | | | | | | |
| | 5% oil-containing powdered sulfur | | | | | 1.00 | | | | | |
| | Vulcanization accelerator 1 | 1.7 | 1.7 | 1.7 | 1.0 | 1.7 | 1.7 | 1.7 | 1.7 | 1.7 | 1.7 |
| | Vulcanization accelerator 2 | 2.2 | 2.2 | 2.2 | 2.2 | 2.2 | 2.2 | 2.2 | 2.2 | 2.2 | 2.2 |
| | Total PHR | 227.8 | 227.8 | 227.8 | 227.8 | 226.9 | 227.8 | 227.8 | 227.8 | 227.8 | 227.8 |
| Evaluation | Room temperature Hs controlled to Shore (A) = 64+/−1 | | | | | | | | | | |
| | ① Initial dry grip performance index (Target > 105) | 110 | 108 | 110 | 115 | 106 | 114 | 117 | 108 | 109 | 112 |
| | ② Late dry grip performance index (Target > 105) | 115 | 112 | 112 | 120 | 109 | 119 | 123 | 110 | 113 | 112 |
| | ③ Chipping resistance index (Target >= 110) | 120 | 116 | 125 | 125 | 112 | 123 | 128 | 116 | 119 | 126 |
| | Elongation at break EB % (Target > 500) | 570 | 560 | 605 | 595 | 540 | 600 | 615 | 565 | 600 | 635 |
| | Overall properties (Average of ① to ③) (Target >= 107) | 115 | 112 | 116 | 120 | 109 | 119 | 123 | 111 | 114 | 117 |

| | | Example | | | Comparative Example | | | | | |
|---|---|---|---|---|---|---|---|---|---|---|
| | | 11 | 12 | 13 | 1 | 2 | 3 | 4 | 5 | 6 |
| Formulation (parts by mass) | NR | | 20 | | | | | | | |
| | SBR (non-oil extended, Styr20, Vynl66, Tg −23° C., Mw 240,000) | 40 | 80 | 80 | 80 | 80 | 80 | 80 | 80 | 80 |
| | BR (Nd-catalyzed BR, Tg −110° C.) | 60 | | 20 | 20 | 20 | 20 | 20 | 20 | 20 |
| | Carbon black 1 (BET 114) | 5 | | 5 | 5 | 5 | 5 | 5 | 5 | 5 |
| | Silica (BET 175) | 75 | 75 | 75 | 75 | 75 | 75 | 75 | 75 | 75 |
| | Silane coupling agent | 6 | 6 | 6 | 6 | 6 | 6 | 6 | 6 | 6 |
| | Resin 1 (softening point 125° C., Tg 64° C.) | 20 | | | | | | | | 20 |
| | Resin 2 (softening point 80° C., Tg 40° C.) | | | | | | | | | |
| | Resin 3 (softening point 85° C., Tg 43° C.) | | | | | | | | | |
| | Resin 4 (softening point 10° C., Tg −30° C.) | | | | | | | | | |
| | Wax | 1.5 | 1.5 | 1.5 | 1.5 | 1.5 | 1.5 | 1.5 | 1.5 | 1.5 |
| | Stearic acid | 2 | 2 | 2 | 2 | 2 | 2 | 2 | 2 | 2 |
| | Process oil | 7 | 7 | 27 | 27 | 27 | 27 | 27 | 27 | 7 |
| | Antioxidant | 2 | 2 | 2 | 2 | 2 | 2 | 2 | 2 | 2 |
| | Zinc oxide | 2.5 | 2.5 | 2.5 | 2.5 | 2.5 | 2.5 | 2.5 | 2.5 | 2.5 |

TABLE 1-continued

Cap tread

| | | | | | | | | | | |
|---|---|---|---|---|---|---|---|---|---|---|
| | Sulfur-containing oligomer 1 (sulfur content 55%, Mw 21,000, SP value 11.1) | 2.9 | 2.9 | | | | | | | |
| | Sulfur-containing oligomer 2 (sulfur content 55%, Mw 17,000, SP value 11.1) | | | | | | | | | |
| | Sulfur-containing oligomer 3 (sulfur content 55%, Mw 42,000, SP value 11.1) | | | | | | | | | |
| | Sulfur-containing oligomer 4 (liquid) (sulfur content 55%, Mw 2,670, SP value 11.1) | | | | | | | 2.9 | | |
| | Sulfur-containing oligomer 5 (liquid) (sulfur content 55%, Mw 1,250, SP value 11.1) | | | | | | | | 2.9 | |
| | Sulfur-containing oligomer 6 (liquid) (sulfur content 55%, Mw 500, SP value 11.1) | | | | | | | | | |
| | Sulfur-containing oligomer 7 (sulfur content 58%, Mw 16,000, SP value 11.1) | | | 2.9 | | | | | | |
| | Hybrid crosslinking agent 1 | | | | | 2.9 | | | | |
| | Hybrid crosslinking agent 2 | | | | | | 2.9 | | | |
| | 5% oil-containing powdered sulfur | | | | 1.50 | 0.50 | 0.50 | | | 1.50 |
| | Vulcanization accelerator 1 | 1.7 | 1.7 | 1.7 | 1.7 | 1.7 | 1.7 | 1.7 | 1.7 | 1.7 |
| | Vulcanization accelerator 2 | 2.2 | 2.2 | 2.2 | 2.2 | 2.2 | 2.2 | 2.2 | 2.2 | 2.2 |
| | Total PHR | 227.8 | 202.8 | 227.8 | 226.4 | 228.3 | 228.3 | 227.8 | 227.8 | 226.4 |
| Evaluation | Room temperature Hs controlled to Shore (A) = 64+/−1 | | | | | | | | | |
| | ① Initial dry grip performance index (Target > 105) | 106 | 117 | 105 | 100 | 100 | 100 | 102 | 103 | 104 |
| | ② Late dry grip performance index (Target > 105) | 106 | 115 | 105 | 100 | 102 | 103 | 103 | 102 | 103 |
| | ③ Chipping resistance index (Target >= 110) | 110 | 135 | 110 | 100 | 99 | 98 | 100 | 98 | 103 |
| | Elongation at break EB % (Target > 500) | 545 | 670 | 530 | 450 | 440 | 435 | 450 | 440 | 490 |
| | Overall properties (Average of ① to ③) (Target >= 107) | 107 | 122 | 107 | 100 | 100 | 100 | 102 | 101 | 103 |

| | | Comparative Example | | | | | | |
|---|---|---|---|---|---|---|---|---|
| | | 7 | 8 | 9 | 10 | 11 | 12 | 13 |
| Formulation (parts by mass) | NR | | | | | | 20 | |
| | SBR (non-oil extended, Styr20, Vynl66, Tg −23° C., Mw 240,000) | 80 | 80 | 80 | 60 | 40 | 80 | 80 |
| | BR (Nd-catalyzed BR, Tg −110° C.) | 20 | 20 | 20 | 40 | 60 | | 20 |
| | Carbon black 1 (BET 114) | 5 | 5 | 5 | 5 | 5 | | 5 |
| | Silica (BET 175) | 75 | 75 | 75 | 75 | 75 | 75 | 75 |
| | Silane coupling agent | 6 | 6 | 6 | 6 | 6 | 6 | 6 |
| | Resin 1 (softening point 125° C., Tg 64° C.) | | | | 20 | 20 | | |
| | Resin 2 (softening point 80° C., Tg 40° C.) | 20 | | | | | | |
| | Resin 3 (softening point 85° C., Tg 43° C.) | | 20 | | | | | |
| | Resin 4 (softening point 10° C., Tg −30° C.) | | | 20 | | | | |
| | Wax | 1.5 | 1.5 | 1.5 | 1.5 | 1.5 | 1.5 | 1.5 |
| | Stearic acid | 2 | 2 | 2 | 2 | 2 | 2 | 2 |
| | Process oil | 7 | 7 | 7 | 7 | 7 | 7 | 27 |
| | Antioxidant | 2 | 2 | 2 | 2 | 2 | 2 | 2 |
| | Zinc oxide | 2.5 | 2.5 | 2.5 | 2.5 | 2.5 | 2.5 | 2.5 |
| | Sulfur-containing oligomer 1 (sulfur content 55%, Mw 21,000, SP value 11.1) | | | | | | | |
| | Sulfur-containing oligomer 2 (sulfur content 55%, Mw 17,000, SP value 11.1) | | | | | | | |
| | Sulfur-containing oligomer 3 (sulfur content 55%, Mw 42,000, SP value 11.1) | | | | | | | |
| | Sulfur-containing oligomer 4 (liquid) (sulfur content 55%, Mw 2,670, SP value 11.1) | | | | | | | |
| | Sulfur-containing oligomer 5 (liquid) (sulfur content 55%, Mw 1,250, SP value 11.1) | | | | | | | |
| | Sulfur-containing oligomer 6 (liquid) (sulfur content 55%, Mw 500, SP value 11.1) | | | | | | | 2.9 |
| | Sulfur-containing oligomer 7 (sulfur content 58%, Mw 16,000, SP value 11.1) | | | | | | | |
| | Hybrid crosslinking agent 1 | | | | | | | |
| | Hybrid crosslinking agent 2 | | | | | | | |
| | 5% oil-containing powdered sulfur | 1.50 | 1.50 | 1.50 | 1.50 | 1.50 | 1.50 | |
| | Vulcanization accelerator 1 | 1.7 | 1.7 | 1.7 | 1.7 | 1.7 | 1.7 | 1.7 |
| | Vulcanization accelerator 2 | 2.2 | 2.2 | 2.2 | 2.2 | 2.2 | 2.2 | 2.2 |
| | Total PHR | 226.4 | 226.4 | 226.4 | 226.4 | 226.4 | 201.4 | 227.8 |
| Evaluation | Room temperature Hs controlled to Shore (A) = 64+/−1 | | | | | | | |
| | ① Initial dry grip performance index (Target > 105) | 104 | 93 | 99 | 102 | 94 | 106 | 102 |
| | ② Late dry grip performance index (Target > 105) | 104 | 95 | 98 | 97 | 89 | 100 | 102 |
| | ③ Chipping resistance index (Target >= 110) | 107 | 93 | 99 | 92 | 90 | 105 | 96 |
| | Elongation at break EB % (Target > 500) | 510 | 420 | 445 | 415 | 395 | 495 | 440 |
| | Overall properties (Average of ① to ③) (Target >= 107) | 105 | 94 | 99 | 97 | 91 | 104 | 100 |

TABLE 2

| | | Example | | | Comparative Example | | |
|---|---|---|---|---|---|---|---|
| | | 14 | 15 | 16 | 14 | 15 | 16 |
| Formulation (parts by mass) | NR | 75 | 75 | 75 | 75 | 75 | 75 |
| | SBR(non-oil extended, Styr20, Vynl66, Tg −23° C., Mw 240,000) | | | | | | |
| | BR(Nd-catalyzed BR, Tg −110° C.) | 25 | 25 | 25 | 25 | 25 | 25 |
| | Carbon black 2 (BET 69) | 38 | 38 | 38 | 38 | 38 | 38 |
| | Wax | 1.5 | 1.5 | 1.5 | 1.5 | 1.5 | 1.5 |
| | Stearic acid | 2 | 2 | 2 | 2 | 2 | 2 |
| | Process oil | 5 | 5 | 5 | 5 | 5 | 5 |
| | Antioxidant | 2.5 | 2.5 | 2.5 | 2.5 | 2.5 | 2.5 |
| | Zinc oxide | 3 | 3 | 3 | 3 | 3 | 3 |
| | Sulfur-containing oligomer 1 (sulfur content 55%, Mw 21,000, SP value 11.1) | 4 | | | | | |
| | Sulfur-containing oligomer 2 (sulfur content 55%, Mw 17,000, SP value 11.1) | | 4 | | | | |
| | Sulfur-containing oligomer 3 (sulfur content 55%, Mw 42,000, SP value 11.1) | | | 4 | | | |
| | Sulfur-containing oligomer 4 (liquid) (sulfur content 55%, Mw 2,670, SP value 11.1) | | | | | | 4 |
| | Sulfur-containing oligomer 5 (liquid) (sulfur content 55%, Mw 1,250, SP value 11.1) | | | | | | |
| | Hybrid crosslinking agent 1 | | | | | 2 | |
| | Hybrid crosslinking agent 2 | | | | | | |
| | 5% oil-containing powdered sulfur | | | | 2.00 | 1.00 | |
| | Vulcanization accelerator 1 | 1.5 | 1.5 | 1.5 | 1.5 | 1.5 | 1.5 |
| | Total PHR | 157.5 | 157.5 | 157.5 | 155.5 | 156.5 | 157.5 |
| Evaluation | Room temperature Hs controlled to Shore (A) = 55+/−1 | | | | | | |
| | Fuel economy index (Target > 100) | 102 | 101 | 103 | 100 | 100 | 95 |
| | Elongation at break EB % index (Target > 110) | 120 | 118 | 128 | 100 | 103 | 105 |

Table 1 demonstrates that the initial dry grip performance, durability of dry grip performance, and chipping resistance (elongation at break) were significantly improved in the Examples using a specific sulfur-containing oligomer of the instant application.

Table 2 demonstrates that elongation at break was improved by 10% or more while maintaining fuel economy in the Examples.

The invention claimed is:

1. A pneumatic tire, formed from a rubber composition, the rubber composition comprising:
   a diene polymer;
   at least one of carbon black or silica; and
   a sulfur-containing oligomer having a weight average molecular weight of 4,000 or more, determined by GPC in chloroform solvent using polystyrene standard oligomers.

2. The pneumatic tire according to claim 1, wherein the sulfur-containing oligomer contains 10 to 95% by mass of elemental sulfur.

3. The pneumatic tire according to claim 1, wherein the sulfur-containing oligomer comprises a repeating unit represented by the following formula (I):

—R—Sx—     (I)

wherein R represents a substituted or unsubstituted divalent hydrocarbon group optionally containing a heteroatom; and x on average is 1.0 to 10.0.

4. The pneumatic tire according to claim 1, wherein the sulfur-containing oligomer has a polarity parameter SP of 12.5 or less.

5. The pneumatic tire according to claim 1, wherein the sulfur-containing oligomer is produced by reacting a dihalogen compound represented by the following formula (I-1):

H—R—H     (I-1)

wherein each H is the same or different and represents a halogen atom; and R represents a substituted or unsubstituted divalent hydrocarbon group optionally containing a heteroatom, with an alkali metal polysulfide represented by the following formula (I-2):

$M_2Sx$     (I-2)

wherein M represents an alkali metal; and x on average is 1.0 to 10.0.

6. The pneumatic tire according to claim 5, wherein the dihalogen compound is 2,2'-dichloroethyl ether.

7. The pneumatic tire according to claim 1, wherein the rubber composition comprises the sulfur-containing oligomer in an amount of 1.0 part by mass or more per 100 parts by mass of the diene polymer.

8. The pneumatic tire according to claim 1, wherein the rubber composition comprises one or two or more vulcanization accelerators.

* * * * *